(12) United States Patent
Umemoto (10) Patent No.: US 6,467,923 B1
(45) Date of Patent: Oct. 22, 2002

(54) LIGHT PIPE, PLANAR LIGHT SOURCE UNIT AND LIQUID-CRYSTAL DISPLAY DEVICE

(75) Inventor: Seiji Umemoto, Osaka (JP)

(73) Assignee: Nitto Denko Corporation, Tokyo (JP)

( * ) Notice: Subject to any disclaimer, the term of this patent is extended or adjusted under 35 U.S.C. 154(b) by 33 days.

(21) Appl. No.: 09/717,338

(22) Filed: Nov. 22, 2000

(30) Foreign Application Priority Data

Nov. 22, 1999 (JP) .......................................... 11-331205

(51) Int. Cl.[7] ................................................ F21V 7/04
(52) U.S. Cl. ......................... 362/31; 362/330; 362/561; 385/146
(58) Field of Search ............................. 362/31, 26, 27, 362/561, 330; 385/146

(56) References Cited

U.S. PATENT DOCUMENTS 5,993,020 A * 11/1999 Koike .......................... 362/31
6,215,409 B1 * 4/2001 Blach .......................... 340/331

* cited by examiner

Primary Examiner—Sandra O'Shea
Assistant Examiner—John Anthony Ward
(74) Attorney, Agent, or Firm—Sughrue Mion, PLLC (57) ABSTRACT

A light pipe has an upper surface, a lower surface, incidence side surfaces, and a light output device in one of the upper and lower surfaces so that light incident on each of the incidence side surfaces is made to exit from the other of the upper and lower surfaces through the light output devices. The light output device is constituted by a repetitive structure of irregularities having ridgelines along the incidence side surfaces, each of the irregularities having a pair of transmission light reflection surfaces which face the incidence side surfaces respectively, the transmission light reflection surfaces are inclined in directions opposite to each other, and having a pair of gentle slopes which are disposed between the pair of transmission light reflection surfaces, each of the gentle slopes is inclined in a direction opposite to the inclination direction of adjacent one of the transmission light reflection surfaces.

8 Claims, 2 Drawing Sheets

LIGHT PIPE, PLANAR LIGHT SOURCE UNIT AND LIQUID-CRYSTAL DISPLAY DEVICE

BACKGROUND OF THE INVENTION

1. Field of the Invention

The present invention relates to a multiple light source type light pipe which can form a planar light source unit excellent in light utilizing efficiency and excellent in brightness and its uniformity, and a reflection type or transmission type liquid-crystal display device bright and easy to view, and which can provide an emission light color conversion system.

The present application is based on Japanese Patent Application No. Hei. 11-331205, which is incorporated herein by reference.

2. Description of the Related Art

A heretofore known light pipe is a side-lighting type light pipe made of a plate-like member having rough surfaces or white dots provided in one of its upper and lower surfaces for scattering light incident on its side surfaces to thereby output the light to the other of its upper and lower surfaces. Such a side-lighting type light pipe is used as follows. That is, a light source is disposed on the side surfaces of the light pipe to thereby form a planar light source unit. The planar light source unit is combined with a liquid-crystal cell to thereby form a reflection type or transmission type liquid-crystal display device.

There was, however, a problem that the light pipe was inferior in brightness and its uniformity and inferior in display quality. Although there was a proposal to dispose light sources on a plurality of side surfaces in order to improve brightness, it was difficult to improve the variation of the brightness. In a system in which a diffusing layer or a prism sheet was disposed in order to control an optical path, the number of parts was increased so that production efficiency was lowered. Incidentally, liquid-crystal display devices are classified into a back-lighting group and a front-lighting group by the position of arrangement of the planar light source unit relative to a liquid-crystal cell. In the aforementioned scattering system, there was a problem that it was difficult to use the scattering system as a front-lighting system because the scattering system disturbed a display image. Such a front-lighting system has been in demand for improvement so that the front-lighting system can exchange light emission colors in the same manner as the back-lighting system with the advance of popularization of display devices to portable telephone sets, etc.

SUMMARY OF THE INVENTION

An object of the present invention is to develop a light pipe which can form a planar light source unit excellent in light utilizing efficiency and excellent in brightness and its uniformity, and which can form a reflection type or transmission type liquid-crystal display device bright and easy to view, and which can be applied to a front-lighting system so that light emission colors can be exchanged.

According to an aspect of the present invention, there is provided a light pipe comprising a plate-like member at least having an upper surface, a lower surface, and incidence side surfaces constituted by opposite two side surfaces between the upper surface and the lower surface. The plate-like member further has light output means in one of the upper and lower surfaces so that light incident on each of the incidence side surfaces is made exit from the other of the upper and lower surfaces through the light output means. The light output means is constituted by a repetitive structure of irregularities having ridgelines along the incidence side surfaces, each of the irregularities having a pair of transmission light reflection surfaces which face the incidence side surfaces respectively, the transmission light reflection surfaces are inclined in directions opposite to each other, and having a pair of gentle slopes which are disposed between the pair of transmission light reflection surfaces, each of the gentle slopes is inclined in a directions opposite to the inclination direction of adjacent one of the transmission light reflection surfaces.

According to another aspect of the present invention, there is provided a planar light source unit comprising the above-mentioned light pipe, and light sources disposed on the incidence side surfaces, respectively, of the light pipe. According to a further aspect of the present invention, there is provided a reflection type liquid-crystal display device comprising the above-mentioned planar light source unit using a light pipe made of a plate-like member having a light output means in an upper surface of the plate-like member as described above, and comprising a reflection layer-including liquid-crystal cell disposed on a lower surface of the light pipe of the planar light source unit. According to another aspect of the present invention, there is provided a transmission type liquid-crystal display device comprising the above-mentioned planar light source unit using a light pipe made of a plate-like member having a light output means in an upper surface or a lower surface of the plate-like member as described above, a transmission type liquid-crystal cell disposed on the upper surface of the light pipe of the light source unit, and a light reflection means disposed on the lower surface of the light pipe.

According to the present invention, light from light sources are made to be incident on two side surfaces of a light pipe so that the incident light exits from one and the same surface through alight output means constituted by a repetitive structure of irregularities. Hence, light from the light sources can be converted efficiently to form a planar light source. Hence, a planar light source unit excellent in brightness and its uniformity can be obtained. When the planar light source unit is used as a back-lighting or front-lighting system, a reflection type or transmission type liquid-crystal display device bright and easy to view can be formed. Further, a liquid-crystal display device using a front-lighting or background system in which light emission colors can be changed in combination of heterochromous emission light sources can be also formed.

Features and advantages of the invention will be evident from the following detailed description of the preferred embodiments described in conjunction with the attached drawings.

DETAILED DESCRIPTION OF THE PREFERRED EMBODIMENTS

Figure 1:
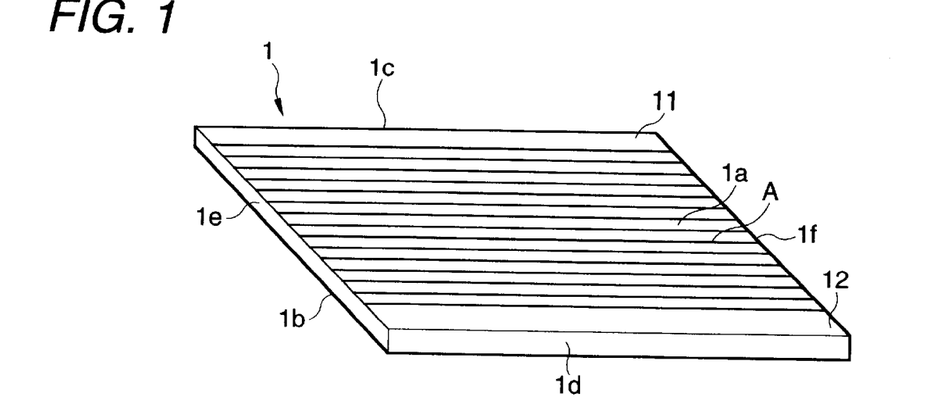
FIG. 1 is a perspective view of an embodiment of a light pipe.

According to an aspect of the present invention, a light pipe comprises a plate-like member at least having an upper surface, a lower surface, and incidence side surfaces constituted by opposite two side surfaces between the upper surface and the lower surface. The plate-like member further has light output means in one of the upper and lower surfaces so that light incident on each of the incidence side surfaces is made to exit from the other of the upper and lower surfaces through the light output means, the light output means being constituted by a repetitive structure of irregularities having ridgelines along the incidence side surfaces. Each of the irregularities has a pair of transmission light reflection surfaces which face the incidence side surfaces respectively, the transmission light reflection surfaces are inclined in directions opposite to each other, and has a pair of gentle slopes which are disposed between the pair of transmission light reflection surfaces. Each of the gentle slopes is inclined in a direction opposite to the inclination direction of the adjacent one of the transmission light reflection surfaces. FIG. 1 shows an embodiment of the light pipe. In FIG. 1, the reference numeral 1 designates a plate-like member for forming the light pipe; 1a, and upper surface; 1b, a lower surface; and 1c and 1d, incidence side surfaces.

The incidence side surfaces are provided so that light sources are disposed thereon and light from the light sources is incident thereon. According to the present invention, opposite two side surfaces between the upper and lower surfaces of the plate-like member 1 as shown in FIG. 1 are used as the incidence side surfaces 1c and 1d. Hence, light can be made incident on the two side surfaces from separate light sources, so that the brightness can be improved and the conversion of emission light color can be performed.

Figure 2:
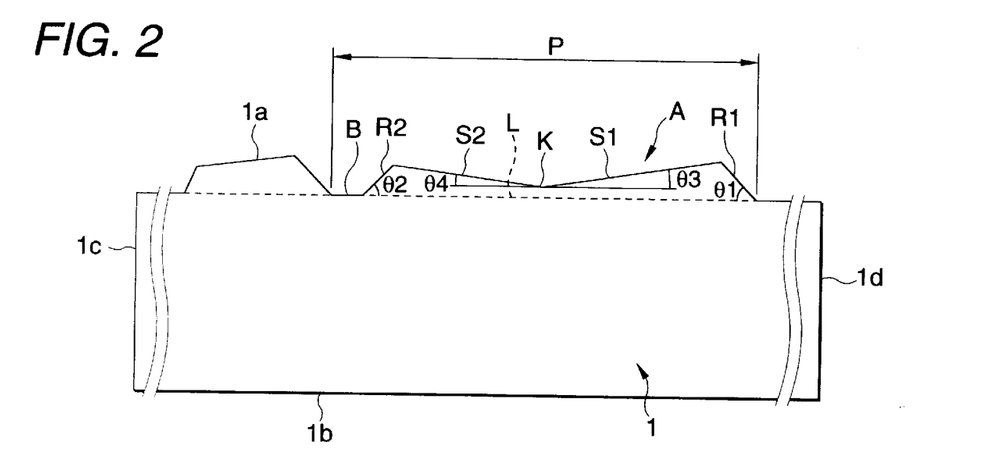
FIG. 2 is a side view of an embodiment of a light output means in the light pipe.

On the other hand, the light output means formed in one of the upper and lower surfaces of the plate-like member is provided so that light incident on the incidence side surfaces is made to go out from the other of the upper and lower surfaces through the light output means. In the present invention, the light output means is constituted by a repetitive structure of irregularities having ridgelines in the direction along the incidence side surfaces 1c and 1d as shown in FIG. 1. As shown in FIG. 2, each of the irregularities A is constituted by a combination of a pair of transmission light reflection surfaces R1 and R2 and a pair of gentle slopes S1 and S2. The pair of transmission light reflection surfaces R1 and R2 face the incidence side surfaces 1c and 1d in opposite directions of inclination respectively. The pair of gentle slopes S1 and S2 are disposed between the pair of transmission light reflection surfaces R1 and R2 and have inclination directions which are opposite to the inclination directions of the pair of transmission light reflection surfaces respectively.

From the above description, the light output means can be disposed correspondingly to the respective incidence side surfaces. Either one of the upper and lower surfaces can be used as a common light exit surface so that light can be made to exit from the common light surface with good directivity. Hence, improvement of light utilizing efficiency, etc. can be achieved. Incidentally, the illustrated case shows that the light output means is provided in the upper surface 1a and the light goes out from the lower surface 1b. That is, the lower surface 1b serves as a light exit surface. From the point of view of increasing the optical path length through the thickness of the light pipe to relax the formation of emission lines from output light through the light output means to standardize the brightness to thereby improve uniformity of light emission, it is preferable that a plate-like member has a light output means formed in its upper surface so that its lower surface is used as a light exit surface. Particularly such a plate-like member is preferably used for a front-lighting system.

From the point of view of light utilizing efficiency, etc., it is preferable that the light output means has slopes in its light exit surface side so that an optical path can be controlled through reflection, especially full reflection of light incident on the incidence side surfaces. The irregularities having such slopes can be constituted by a suitable structure of irregularities each having equal-side surfaces, or the like.

The preferable irregularity structure is configured so that light as large in quantity as possible exits from the light exit surface of the light pipe in a direction perpendicular (normal) to the reference plane and that the direction of light leaking from the light pipe is prevented as sufficiently as possible from overlapping the direction of the exit light serving as display light when the light source unit is used as a front-lighting system for a reflection type liquid-crystal display device. If leaking light overlaps display light, the intensity of a display image is reduced so that the reduction of intensity is apt to cause lowering of contrast.

The irregularities which are preferable from the point of view of the exit of light in a direction of a normal line and prevention of overlapping between leaking light and display light are provided as a repetitive structure of irregularity units A each having substantially a pentagon in sectional view so as to be protruded from the reference plane L shown by the broken line in the light output means-forming surface as shown in FIG. 2. Each of the inclination angles $\theta1$ and $\theta2$ of the transmission light reflection surfaces R1 and R2 with respect to the reference plane L is in a range of from 30 to 45 degrees. Each of the inclination angles $\theta3$ and $\theta4$ of the gentle slopes S1 and S2 with respect to the reference plane L is in a range of from $\theta$ to 10 degrees. A point K of intersection between the gentle slopes is located outside the reference plane L.

The transmission light reflection surfaces R1 and R2 have a role of reflecting light given to themselves among the light incident on the incidence side surfaces to thereby supply the reflected light to the light exit surface. In this case, setting the inclination angles $\theta1$ and $\theta2$ to be in a range of from 30 to 45 degrees permits transmission light to be reflected well perpendicularly to the light exit surface. Thus, output light favorable for display can be obtained efficiently. Each of the preferable inclination angles of the transmission light reflection surfaces from the point of view of the aforementioned performances such as total reflection based on Snell laws, suppression of leaking light, suppression of disturbance of viewing due to the leaking light, etc. is in a range of from 35 to 44 degrees, particularly in a range of from 38 to 43 degrees.

If each of the inclination angles of the transmission light reflection surfaces is smaller than 30 degrees, the direction of light exiting from the light exit surface has a large angle to the normal line. As a result, the quality of light allowed to be effectively used for viewing is reduced so that brightness is apt to be lowered. If each of the inclination angles of the transmission light reflection surfaces is larger than 45 degrees, the quantity of light leaking from the light output means-forming surface is increased so that contrast of a display image is apt to be lowered. Incidentally, in FIG. 2, the transmission light reflection surface R1 corresponds to the incidence side surface 1c and the transmission light reflection surface R2 corresponds to the incidence side surface 1d.

On the other hand, the gentle slopes have a role of reflecting transmission light incident on the gentle slopes to thereby supply the reflected light to the transmission light reflection surfaces, or the like. When the light pipe is applied to a front-lighting system for a reflection type liquid-crystal display device, the gentle slopes have a role of transmitting a display image from a liquid-crystal cell. When the light pipe is applied to a back-lighting system for a transmission type liquid-crystal display device, the gentle slopes have a role of improving light utilizing efficiency through a reflection layer, or the like. From this point of view, it is preferable that each of the inclination angles θ3 and θ4 of the gentle slopes with respect to the reference plane L is in a range of from θ to 10 degrees.

From the above description, when transmission light at an angle larger than the inclination angle is incident on the gentle slopes, the light is reflected by the gentle slopes. In this case, the light reflected at an angle more parallel to the reference plane on the basis of the inclination angle of the gentle slopes is incident on the transmission light reflection surfaces adjacent to the gentle slopes. Hence, the light is reflected by the transmission light reflection surfaces so that the reflected light is condensed well by the aforementioned collimation and exits from the light exit surface. In this case, shaping the irregularities of the light output means so convexly as to protrude the irregularities from the reference plane L as described above makes it possible to increase the degree of freedom in concave-convex shape design. Moreover, shaping the irregularities so convexly as to locate the intersection point K of the gentle slopes outside the reference plane L makes it possible to design the gentle slopes having smaller inclination angles advantageously. Incidentally, in the shape in which the intersection point K is located inside the reference plane L, transmission light is blocked by the gentle slopes. As a result, efficiency of incidence on the transmission light reflection surfaces is lowered, so that output efficiency is lowered.

As a result, transmission light entering the transmission light reflection surfaces through reflection after entering the gentle slopes in addition to transmission light directly entering the transmission light reflection surfaces can be supplied to the light exit surface on the basis of reflection through the transmission light reflection surfaces. Hence, improvement of light utilizing efficiency can be attained correspondingly. Moreover, the angle of incidence of light entering the transmission light reflection surfaces adjacent to the gentle slopes on the basis of reflection trough the gentle slopes can be kept constant. Hence, variation in reflection angle can be suppressed so that collimation/condensation of the exit light can be attained. If the inclination angle of the gentle slope provided for one incidence side surface is larger than 10 degrees, the transmission angle of transmission light incident on the gentle slope provided for the other incidence side surface is increased by reflection. As a result, when the light is incident on the transmission light reflection surface, the angle exceeds the full reflection angle. As a result, the light is transmitted fully, so that light loss is apt to increase.

Hence, adjusting the inclination angles of the transmission light reflection surfaces and gentle slopes in the irregularities for forming the light output means permits high-grade directivity to be given to output light. Hence, light can be made to exist in a direction perpendicular to the light exit surface or at an angle near the perpendicular direction. Incidentally, each of the inclination angles of the gentle slopes maybe 0 degrees. It is, however, preferable from the point of view of the aforementioned performance such as condensation of output light due to collimation of transmission light, suppression of leaking light, or the like, that the inclination angle is in a range of from 0 (not inclusively) to 8 degrees, especially in a range of from 2 to 7 degrees.

From the point of view of obtaining a brighter display image, the light output means is preferably provided as irregularities in which the projected area of the gentle slopes on the reference plane is not smaller than 5 times, particularly not smaller than 10 times, more particularly not smaller than 15 times as large as that of the transmission light reflection surfaces. Hence, a great part of the display image generated by the liquid-crystal cell can be transmitted through the gentle slopes when the light pipe is applied to a front-lighting system for a reflection type liquid-crystal display device. On the other hand, when the light pipe is applied to a back-lighting system for a transmission type liquid-crystal display device, the area of the reflection surface can be kept large. This is favorable for improvement of light utilizing efficiency.

In consideration that the pixel pitch of the liquid-crystal cell is generally in a range of from 100 to 300 μm, from the point of view of keeping the area of the gentle slopes large enough to prevent occurrence of moire due to interference with the pixels of the liquid-crystal cell, formability of sharp irregularities, etc., it is preferable that the size of each of the transmission light reflection surfaces is set to be not larger than 40 μm, particularly in a range of from 3 to 30 μm, more particularly in a range of from 5 to 25 μm in terms of the projected width thereof on the reference plane.

From the aforementioned point of view, it is preferable that the distance between adjacent ones of the transmission light reflection surfaces is large. As described above, however, the transmission light reflection surfaces serve as a functional portion for substantially outputting light incident on the side surfaces. Hence, if the distance is too large, illumination becomes so sparse that display may be unnatural. In consideration of these, the repetition pitch P (see FIG. 2) of the irregularity units is preferably set to be in a range of from 50 μm to 1 mm and the distance (B in FIG. 2) between adjacent ones of the irregularity units is preferably set to be not larger than 200 μm. Incidentally, the pitch may be irregular as represented by a random pitch or a random or regular combination of a predetermined number of pitch units. It is, however, preferable from the point of view of prevention of moire, external appearance, etc. that the pitch is constant.

Moreover, from the point of view of improving efficiency of incidence of transmission light on the transmission light reflection surfaces to achieve improvement of brightness and its uniformity due to improvement of light utilizing efficiency, it is preferable that the irregularity unit is formed so that the height of protrusion of the transmission light reflection surfaces provided for the incidence side surfaces respectively from the reference plane increases as the transmission light reflection surfaces go farther from the corresponding incidence side surfaces respectively. Therefore, the inclination angles of the transmission light reflection surfaces and the gentle slopes with respect to the reference plane may change in accordance with the direction of transmission of light. In one irregularity unit, the transmission light reflection surfaces and gentle slopes need not be laterally symmetric with respect to the intersection point K of the gentle slopes in terms of sectional view. That is, the inclination angles of the transmission light reflection surfaces and gentle slopes corresponding to the incidence side surfaces respectively may be different from each other except reversal of the direction of inclination.

When the light output means is constituted by a repetitive structure of irregularities, moire may occur because of interference between the light output means and the pixels of the liquid-crystal cell. Although prevention of moire can be made by adjustment of the pitch of the irregularities, the pitch of the irregularities is limited to the aforementioned preferable range. Hence, as measures against the case where moire occurs in the pitch range, a method in which the irregularities are formed to be inclined with respect to the reference plane of the incidence side surfaces so that the irregularities can be arranged to cross the pixels is used preferably. On this occasion, if the inclination angle is too large, deflection occurs in reflection through the transmission light reflection surfaces, or the like. As a result, large deviation occurs in the direction of output light. Hence, anisotropy in the intensity of light emission in the light-transmitting direction of the light pipe becomes large, so that light utilizing efficiency is lowered. This is apt to cause lowering of display quality.

From the aforementioned point of view, the inclination angle of the direction of arrangement of the irregularities with respect to the reference plane of the incidence side surfaces, that is, the inclination angle of the direction of ridgelines of the irregularities is preferably set to be in a range of ±30 degrees, especially in a range of ±25 degrees, more especially in a range of ±20 degrees. Incidentally, the symbol "±" means the direction of inclination with the incidence side surfaces as a reference. If moire is negligible, it is preferable that the irregularities are arranged to be as parallel with the incidence side surfaces as possible.

Incidentally, the transmission light reflection surfaces and gentle slopes constituting the irregularities of the light output means may be formed into a suitable surface shape such as a linear surface, a folded surface or a curved surface. Further, the irregularities may be constituted by repetition of a combination of irregularities different in shape, etc. In addition, the irregularities may be formed as a series of convex or concave portions having ridgelines continuously connected to one another or maybe formed as intermittent convex or concave portions discontinuously arranged at intervals of a predetermined distance in the direction of the ridgeline.

The light pipe may be formed into a suitable shape. Generally, from the point of view of securing opposite incidence side surfaces, it is preferable that the light pipe is provided as a plate in which the incidence side surfaces $1c$ and $1d$ and side surfaces $1e$ and $1f$ perpendicular to the incidence side surfaces $1c$ and $1d$ are all equal in thickness as the illustration. The light exit surface of the light pipe, that is, either upper or lower surface having no light output means is generally provided as a flat surface. However, when the light pipe is applied to a front-lighting system for a reflection type liquid-crystal display device so that the light pipe is viewed from the upper surface, the light output means may interfere with a pattern of the light output means on the light exit surface so that a moire phenomenon occurs. To prevent lowering of display quality due to the moire, the light exit surface may be provided as a light exit surface structure in which fine irregularities are applied as occasion demands.

The formation of the fine irregularities in the light exit surface can be made by a suitable method in accordance with the formation of the background-art diffusing layer. Examples of the method include a surface roughening method using matting such as sandblasting, a method for giving fine irregularities through a mold, or the like, when the light pipe is formed, a method for applying a resin layer containing transparent particles, a method for providing diffusing dots on the light pipe or providing a sheet having diffusing dots on the surface light pipe, etc.

Also the shapes of side surfaces such as the incidence side surfaces in the light pipe may be determined suitably without any particular limitation. Generally, from the point of view of arrangement of light sources, etc., it is preferable that the incidence side surfaces are provided as surfaces perpendicular to the light exit surface. Alternatively, each of the incidence side surfaces may be provided as a concave shape corresponding to the external shape of the cathode tube. Each of the incidence side surfaces may be shaped so convexly as to be protruded through transparent members 11 and 12 as shown in FIG. 1. Such a protrusive shape is provided for the purpose of preventing variation in light emission from occurring in end portions, or the like, when light sources shorter than the incidence side surfaces are used. That is, the protruded shape is provided so that the light scattering effect prevents shade from being produced in non-light-emission portions because of electrodes, or the like, in the light sources arranged on the incidence side surfaces.

The light pipe can be made of a suitable material exhibiting transparency in accordance with the wave range of the light sources. Incidentally, examples of the material to be used in a visible light range include transparent resin such as acrylic resin, polycarbonate resin, polyester resin, norbornene resin, polyolefin resin or epoxy resin, glass, etc. A light pipe made of a material exhibiting no birefringence or small birefringence may be used preferably.

The light pipe can be formed by a suitable method such as a cutting method. Examples of the production method which are preferable from the point of view of mass production include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, ultraviolet rays or radial rays is polymerized in the condition that the fluid resin is cast in a mold capable of forming a predetermined shape or the mold is filled with the fluid resin; and so on.

The thickness of the light pipe can be determined suitably in accordance with the size of the light pipe, the size of the light source, etc. in accordance with the purpose of use. Generally, the thickness of the light pipe to be used for forming a transmission type or reflection type liquid-crystal display device, or the like, is not larger than 20 mm, especially in a range of from 0.1 to 10 mm, more especially in a range of from 0.3 to 5 mm in terms of the thickness of the incidence side surfaces. Incidentally, the light pipe need not be formed as a monolithic single-layer plate made of one kind of material. The light pipe may be formed as a laminate of parts made of one kind of material or different kinds of materials. For example, the light pipe may be provided as a plate in which a sheet having a light output means adheres to a light guide portion for performing transmission of light.

Figure 3:
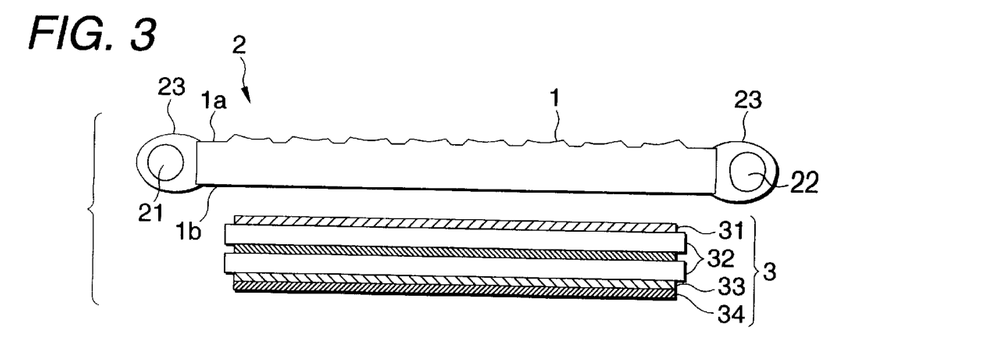
FIG. 3 is a side view of an embodiment of a reflection type liquid-crystal display device using a front-lighting system.
Figure 4:
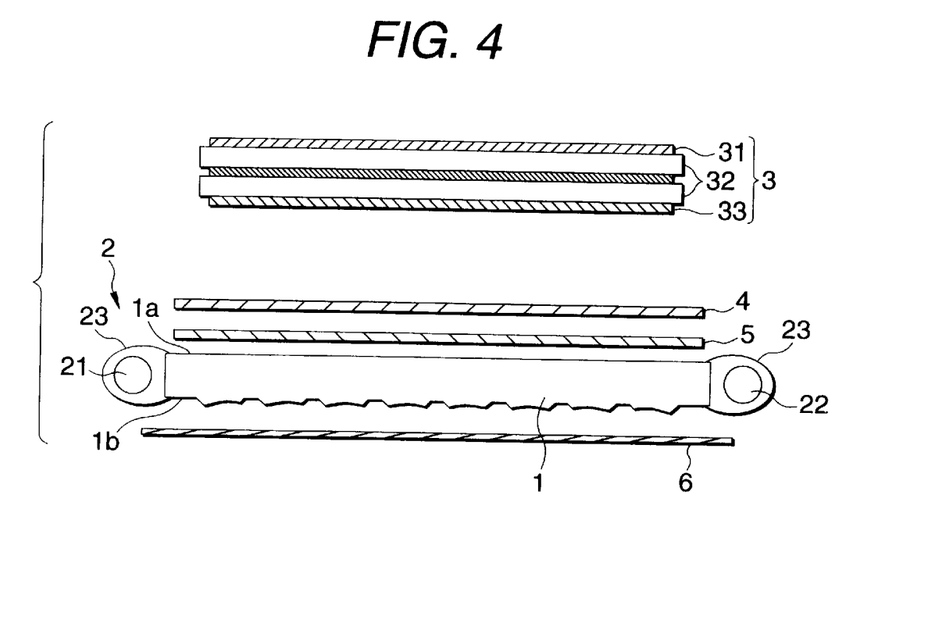
FIG. 4 is a side view of an embodiment of a transmission type liquid-crystal display device using a back-lighting system.
Figure 5:
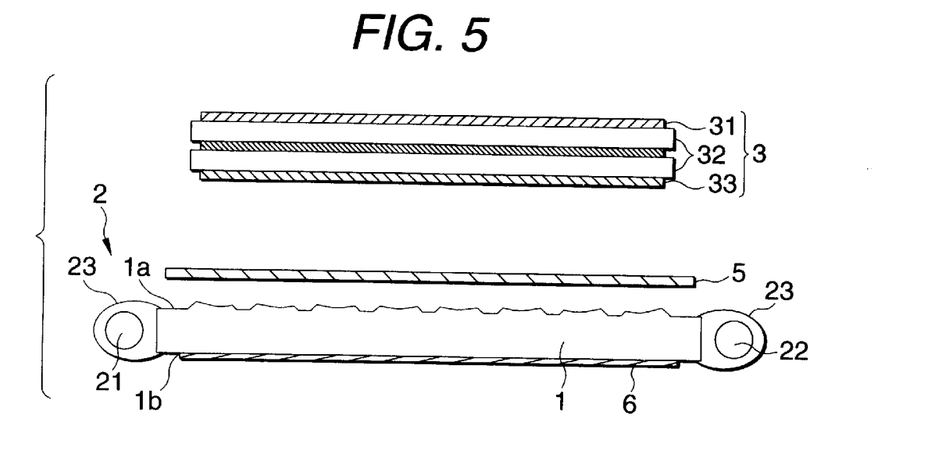
FIG. 5 is a side view of another embodiment of the transmission type liquid-crystal display device using a back-lighting system.

The planar light source unit according to the present invention is provided for use as a side-lighting type front-lighting or back-lighting system in a transmission type or reflection type liquid-crystal display device. As shown in FIGS. 3 to 5, the light sources 21 and 22 are disposed on the opposite incidence side surfaces 1c and 1d of the light pipe 1 respectively. A suitable material exhibiting light emission characteristic in monochromatic light or in various wave ranges can be used as the light source in accordance with the purpose of use of the planar light source unit without any particular limitation.

Examples of the aforementioned light source may include point light sources such as a (cold or hot) cathode tube, light-emitting diodes, or the like; an array of the point light sources; a linear light source obtained by conversion of light of point light sources, a slender electroluminescent device, etc. In the planar light source unit to be used for forming a liquid-crystal display device, a member exhibiting light-emitting characteristic in a wave range as wide possible in a visible light range is preferably used.

The combination of light sources to be arranged on the light pipe can be determined suitably in accordance with the purpose of use. For example, one kind of light sources may be used or different kinds of light sources in light emission color may be used. Further, the light sources may be switched on/off independently or dependently by a suitable method. From the point of view of power saving, convenience of a light source driver, easiness of switching on/off, easiness of assembling of heterochromous emission light sources, etc., it is particularly preferable that light-emitting diodes are used, especially for forming a linear light source.

An example of the linear light source formed by conversion of light from point light sources is as follows. Point light sources are arranged on the back and side surfaces of a linear light pipe made of a rectangular parallelepiped, or the like, formed so that the point light sources can be arranged on the incidence side surfaces in the same manner as in the aforementioned light pipe so that incidence light from the point light sources can be converted to form a linear light source. In this case, in a system in which point light sources are disposed on side surfaces of a linear light pipe, an optical path changing means having a suitable shape constituted by a dot structure or a repetitive structure of irregularities maybe also-provided on the back surface of the linear light pipe.

The planar light source unit may be formed as a combination in which suitable assisting means such as light source holders 23 for enclosing the light sources to lead light radiated from the light sources to the incidence side surfaces of the light pipe are arranged as shown in FIGS. 3 to 5. A resin sheet coated with a high-reflectance metal thin film, a sheet of metal foil, a white sheet, or the like, is generally used as each of the light source holders. When the planar light source unit is used as aback-lighting system, each of the light source holders may be extended to the light exit surface of the light pipe so that the light source holder can serve as a reflection sheet.

The planar light source unit according to the present invention provides a planar light source excellent in brightness because the planar light source unit utilizes light from the light sources efficiently. It is easy to increase the area of the planar light source unit. Hence, the planar light source unit can be applied to various devices such as a front-lighting system for a reflection type liquid-crystal display device or a back-lighting system for a transmission type liquid-crystal FIG. 3 shows an embodiment of a reflection type liquid-crystal display device using the planar light source unit as a front-lighting system. In FIG. 3, a reflection type liquid-crystal display unit 3 having polarizing plates 31 and 33 on both sides of a liquid-crystal cell 32 and further having a reflection layer 34 on the back surface of the liquid-crystal cell 32 is arranged on the light exit surface (lower surface 1b) of the light pipe 1 having the light output means in the upper surface 1a of the planar light source unit 2 to thereby form the reflection type liquid-crystal display device. When the planar light source unit is switched off, the liquid-crystal display device can serve as a reflection type liquid-crystal display device using external light.

On the other hand, FIGS. 4 and 5 show an embodiment of a liquid-crystal display device using the planar light source unit as a back-lighting system. A transmission type liquid-crystal display unit 3 is disposed through a light diffusing layer 5 on the upper side of the light pipe 1 in the planar light source unit to thereby form the liquid-crystal display device. The light guide unit 1 has a reflection layer 6 on its back surface side. Hence, the liquid-crystal display device can serves as a reflection type liquid-crystal display device and also as a transmission type liquid-crystal display device.

Incidentally, FIG. 4 shows an embodiment in which a transmission type liquid-crystal cell 32 is disposed on the upper surface 1a of the light pipe in the planar light source unit 2 using the light pipe 1 having the light output means in its lower surface 1b. FIG. 5 shows an embodiment in which a transmission type liquid-crystal cell 32 is disposed on the upper surface of the light pipe in the surface light pipe 2 using the light pipe 1 having the light output means in its upper surface 1a. Hence, either the light output means-forming surface of the light pipe or the non-forming surface thereof can be disposed as the liquid-crystal cell side. On this occasion, when a light reflection means such as a reflection layer is disposed on the back surface of the light pipe, that is, on the side in which the liquid-crystal cell is not disposed, a liquid-crystal display device serving as a reflection type liquid-crystal display device and also as a transmission type liquid-crystal display device can be formed.

As shown in the aforementioned drawings, the liquid-crystal display device is at least constituted by the planar light source unit and the liquid-crystal cell and is formed by arrangement of the liquid-crystal cell on a predetermined surface of the light pipe 1 in the planar light source unit. On this occasion, in the reflection type liquid-crystal display device using the planar light source unit as a front-lighting system, the planar light source unit 2 is arranged on the visual side of the liquid-crystal display unit 3 having the reflection layer 34 on its back surface as shown in FIG. 3 so that the light output means-forming surface of the light pipe 1 is positioned on the upper side (visual side).

Hence, it is essential to the reflection type liquid-crystal display device using a front-lighting system that at least the liquid-crystal layer of the liquid-crystal cell is positioned between the light pipe in the planar light source unit and the reflection layer so that the light output means-forming surface of the light pipe is disposed on the visual side. The visual recognition is performed as follows. External light transmitted through the gentle slope portions S1 and S2 in the light pipe of the planar light source unit or light exiting from the light pipe at the time of switching-on is transmitted through the liquid-crystal cell and then turned over by the reflection layer. The turned-over light is transmitted through the liquid-crystal cell again and further transmitted through the portions S1 and S2 in the light pipe. In this manner, the visual recognition is performed. Incidentally, the aforementioned reflection layer may be attached to a cell substrate, or the like, so that the reflection layer can be provided in the inside of the liquid-crystal cell.

On the other hand, in the transmission type liquid-crystal display device using the planar light source unit as a back-lighting system as shown in FIGS. 4 and 5, the light pipe of the planar light source unit is disposed on the back surface side (opposite to the visual side) of the liquid-crystal cell. When the light pipe having the light out put means-forming surface is used on the visual side as shown in FIG. 5 or when the liquid-crystal display device is used as a transmission-reflection double type liquid-crystal display device as shown in FIGS. 4 and 5, the light pipe of the planar light source unit is disposed between the liquid-crystal cell and the reflection layer.

In the method in which light is turned over by the reflection layer disposed on the light exit surface so that the light output means-forming surface side of the light pipe is disposed as the liquid-crystal cell side as shown in FIG. 5, the optical path length from the light output means to the liquid-crystal cell is increased so that the emission-line pattern due to the light output means can be relaxed. This method has an advantage in that occurrence of display failure such as moire can be suppressed.

Viewing the aforementioned transmission type liquid-crystal display device is performed as follows. Light exiting from the planar light source unit enters the liquid-crystal cell directly or through turn-over at the reflection layer, so that the light is transmitted through the liquid-crystal cell. On the other hand, viewing the reflection-transmission double type liquid-crystal display device is performed as follows. In a transmission mode, viewing is performed in the same manner as in the transmission type liquid-crystal display device. In a reflection mode, external light is transmitted through the liquid-crystal cell and turned over by the reflection layer on the back surface of the light pipe. The turned-over light is transmitted through the gentle slope portions S1 and S2 in the light pipe and the liquid-crystal cell again. Thus, viewing is performed.

Generally, the liquid-crystal display device is formed by assembling a liquid-crystal display unit including a liquid-crystal cell 32 having a transparent electrode functioning as a liquid-crystal shutter as shown in FIGS. 3 to 5, a driver attached to the liquid-crystal cell, a polarizing plate, etc., by assembling a back-lighting or front-lighting system including a change-over switch for changing over light-on/off as occasion demands and by assembling constituent parts such as a light condensing means 4, a light diffusing layer 5, a reflection layer 6, an anti-reflection layer, a compensatory retarder plate, etc. suitably as occasion demands.

In the present invention, the liquid-crystal display device can be formed in the same manner as in the background art without any limitation except that the aforementioned light pipe or planar light source unit is used. Hence, the liquid-crystal cell to be used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

Incidentally, in FIGS. 3 to 5, the liquid-crystal cell 32 has a liquid-crystal layer enclosed in a cell substrate. In this case, the cell substrate may serve as the light pipe according to the present invention. In FIGS. 3 to 5, a transparent electrode and a driver attached to the transparent electrode are not shown.

The polarizing plate to be provided on one or each of the front and back surfaces of the liquid-crystal cell is not particularly limited. From the point of view of obtaining good-contrast-ratio display based on incidence of high-grade linearly polarized light, etc., it is preferable to use a member high in the degree of polarization such as an absorption type linear polarizer of iodine or dye particularly as the back-lighting side or front-lighting side polarizing plate.

The reflection layer can be formed as a suitable reflection layer according to the background art. Examples of the reflection layer include: a coating layer containing powder of a high-refractive-index metal such as aluminum, silver, gold, copper or chromium in a binder resin; a layer of a-metal thin film deposited by a vapor deposition method, or the like; a reflection sheet having the coating or deposited layer supported by a substrate; a sheet of metal foil; and so on. When the reflection layer is provided in the inside of the liquid-crystal cell, the reflection layer is preferably formed by a method of forming an electrode pattern of a high electrically conductive material such as a high-reflectance metal as described above or by a method of providing a transparent electrode pattern on the reflection layer of a high-reflectance metal film through an electrically insulating layer.

Incidentally, the reflection layer in the reflection type liquid-crystal display device may be provided outside the liquid-crystal cell, for example, in the condition that a reflection layer made of a high-reflectance metal film is provided on a plastic film. In the case of a transmission type liquid-crystal display device, the reflection layer may be directly attached to the light pipe for forming a back-lighting system. The reflection layer can be provided on either the light output means-forming surface or the light exit surface of the light pipe in accordance with the mode of use by a suitable method as described above.

When the liquid-crystal display device is formed, suitable optical devices such as an anti-glare layer or an anti-reflection film to be provided on the visual side surface, a light diffusing plate, a compensatory retarder plate, a polarization separating plate, a light condensing means, etc. may be disposed in suitable positions respectively as described above. Incidentally, the anti-reflection film maybe provided on the light exit surface of the surface light pipe. The light condensing means is provided for condensing light by controlling the optical path. For example, the light condensing means may be constituted by a prism sheet or a lens sheet. As shown in FIG. 4, one layer of light condensing means 4 may be disposed in a suitable position or a plurality of light condensing means 4 may be disposed on suitable positions, for example, between the light pipe 1 and the liquid-crystal display unit 3.

On the other hand, the compensatory retarder plate is provided for compensating for wavelength dependence of birefringence, or the like, to attain improvement of visibility, or the like. The compensatory retarder plate is disposed between the visual side polarizing plate and the liquid-crystal cell and/or between the back-lighting side polarizing plate and the liquid-crystal cell as occasion demands. A suitable member in accordance with the wave range or the like may be used as the compensatory retarder plate. The compensatory retarder plate may be obtained as a birefringent sheet made of a drawn film of polycarbonate, polysulfone, polyester, polymethyl methacrylate, polyamide, polyvinyl a alcohol, or liquid crystal polymer orientation layer support sheet, or the like. Alternatively, the compensatory retarder plate may be formed as a multilayer of the phase-difference sheets.

The light diffusing layer is provided for obtaining surface light emission of uniform brightness based on prevention of unevenness in brightness, reducing moire based on mixture of adjacent light rays, etc. One light diffusing layer may be disposed in a suitable position of the liquid-crystal display device or a plurality of light diffusing layers may be disposed in suitable positions of the liquid-crystal display device as occasion demands. Incidentally, in the embodiment of FIGS. 4 and 5, the light diffusing layer 5 is disposed between the light pipe 1 and the liquid-crystal display unit 3. Incidentally, from the point of view of keeping the directivity of light exiting from the surface light pipe, etc., a diffusing layer having a narrow diffusing range can be used preferably.

The light diffusing layer can be formed by a suitable method in accordance with the aforementioned fine irregularities of the light exit surface. Examples of the method include: a method of applying and curing a low-refractive-index transparent resin containing high-refractive-index transparent particles dispersed therein; a method of applying and curing a transparent resin containing air bubbles dispersed therein; a method of swelling a surface of a substrate through a solvent to thereby generate a craze; a method of forming a transparent resin layer having an irregular rough surface; and a method using a diffusing sheet formed in the aforementioned manner.

Incidentally, when the transparent type liquid-crystal display device is formed, a polarization separating plate may be disposed between the planar light source unit and a polarizing plate in order to improve brightness. The polarization separating plate has a function of separating natural light into polarized light through transmission and reflection. The polarization separating plate is represented by a sheet having a layer having a cholesteric liquid-crystal phase, especially having a layer made of a liquid-crystal polymer exhibiting a cholesteric phase or by a dielectric multilayer film provided on a transparent substrate. Incidentally, according to the cholesteric liquid-crystal phase, light can be separated into left and right circularly polarized light groups through transmission and reflection. According to the dielectric multilayer film, light can be separated into linearly polarized P-wave and S-wave light groups through transmission and reflection. Further, the circularly polarized light can be converted into linearly polarized light through a quarter-wave plate.

Therefore, when polarized light transmitted through the polarization separating plate is made incident on a polarizing plate while the axes of polarization are made as coincident as possible, absorption loss due to the polarizing plate can be suppressed so that improvement of brightness can be achieved. In the planar light source unit constituted by the light guide unit 1 having the reflection layer 6 on its back surface as shown in FIGS. 4 and 5, polarized light reflected by the polarization separating plate can be turned over by the reflection layer 6 and made to enter the polarization separating plate again. Hence, the turned-over light can be partially or wholly transmitted, so that improvement of brightness can be achieved by improvement of light utilizing efficiency.

In the present invention, optical devices or parts such as a light pipe, a liquid-crystal cell, a polarizing plate, etc. for forming the planar light source unit or the liquid-crystal display device may be wholly or partially integrally laminated/fixed onto one another or may be disposed separably. From the point of view of prevention of lowering of contrast based on suppression of surface reflection, etc., it is preferable that such parts are fixed onto one another. A suitable transparent adhesive agent such as a tackifier can be used for the fixing process.

EXAMPLE 1

A mold cut into a predetermined shape in advance by a diamond bit was filled with hot-melted polymethyl methacrylate of high fluidity. Then, the polymethyl methacrylate was cooled and taken out to obtain a light pipe. The light pipe was made of an equal-thickness flat plate 40 mm wide, 28 mm deep and 1 mm thick. The light pipe had widthwise opposite two surfaces as incidence side surfaces. The light pipe had a light output means on its single surface. The light output means was parallel to the incidence side surfaces and was formed to start from a position far by 2 mm from the incidence side surfaces respectively.

The light output means was constituted by a repetitive structure of irregularities disposed at intervals of a predetermined pitch of 250 $\mu$m on the basis of the convex shape formed into a pentagon in sectional view as shown in FIG. 2 with respect to the reference plane L. Each of the inclination angles $\theta 1$ and $\theta 2$ of the transmission light reflection surfaces R1 and R2 facing the incidence side surfaces respectively was 41 degrees. As each of the transmission light reflection surfaces went farther from corresponding one of the incidence side surfaces, the inclination angle became larger. Each of the inclination angles $\theta 3$ and $\theta 4$ of the gentle slopes S1 and S2 was 6.5 degrees. The projected width of each of the transmission light reflection surfaces on the reference plane was in a range of from 12 to 21 $\mu$m. The distance (B) between adjacent convex portions was not larger than 50 $\mu$m. Incidentally, the repetitive structure of irregularities was symmetric with respect to a line parallel to the incidence side surfaces in the center between the incidence side surfaces.

Then, two green light-emitting diodes were provided on left and right surfaces, respectively, of a linear light pipe having an effective light emission width of 41 mm. The two green light-emitting diodes were connected to a DC power supply. Thus, a light source 1 was prepared. Incidentally, the linear light pipe was made a rectangular parallelepiped 42 mm wide, 2.5 mm deep and 1.5 mm thick. The light source 1 was disposed on one of the two incidence side surfaces of the aforementioned light pipe. A light source 2 having red light-emitting diodes instead of the green light-emitting diodes was disposed on the other incidence side surface of the light pipe. Thus, a planar light source unit was obtained.

Then, a normally white reflection type twisted nematic liquid-crystal display unit was disposed on a surface of the light pipe in the planar light source unit where there was no light output means. Thus, a reflection type liquid-crystal display device using a front-lighting system was obtained. Incidentally, viewing was performed through the upper surface side of the light pipe in which the light output means was formed.

EXAMPLE 2

A light diffuse type reflection plate formed by silver vapor deposition was disposed on the lower surface of the planar light source-unit obtained in Example 1. A normally white transmission type twisted nematic liquid-crystal display unit was disposed on the upper surface side of the planar light source unit through a diffusing film having a haze of 83%. Thus, a transmission type liquid-crystal display device using a back-lighting system was obtained.

A transmission type liquid-crystal display device using a back-lighting system was obtained in the same manner as in Example 2 except that the planar light source unit was disposed in the condition that the light pipe was turned upside down.

COMPARATIVE EXAMPLE 1

A light pipe, a planar light source unit and a reflection type liquid-crystal display device were obtained in the same manner as in Example 1 except that the light output means was constituted by a repetitive structure of irregularities each shaped like an isosceles triangle in sectional view with a vertical angle of 98 degrees and disposed at intervals of a predetermined pitch of 250 $\mu$m.

COMPARATIVE EXAMPLE 2

A transmission type liquid-crystal display device was obtained in the same manner as in Example 2 except that the planar light source unit according to Comparative Example 1 was used.

COMPARATIVE EXAMPLE 3

A planar light source unit and a transmission type liquid-crystal display device were obtained in the same manner as in Example 2 except that a light pipe having a sandblasted rough surface as a light output means in its single surface was used.

COMPARATIVE EXAMPLE 4

A transmission type liquid-crystal display device was obtained in the same manner as in Example 3 except that the planar light source unit according to Comparative Example 1 was used.

COMPARATIVE EXAMPLE 5

A transmission type liquid-crystal display device was obtained in the same manner as in Example 3 except that the planar light source unit according to Comparative Example 3 was used.

Evaluation Test 1

The reflection type or transmission type liquid-crystal display device obtained in each of Examples and Comparative Examples was examined as follows. The light source 1 or 2 was switched on in the condition that the liquid-crystal cell was supplied with no voltage. In this condition, frontal brightness in the center of the device, frontal brightness in the incidence portion on the lighting side and frontal brightness in a portion opposite to the incidence portion were measured by a brightness meter (BM7, made by Topcon Corp.). Results of the measurement were shown in the following Table. Incidentally, the light source 1 was provided for emitting-green light.

| | Frontal Brightness (cd/m$^2$) | | | | | |
|---|---|---|---|---|---|---|
| | Light Source 1 | | | Light Source 2 | | |
| | Incidence portion | Center Portion | Counter portion | Incidence portion | Center portion | Counter portion |
| Example 1 | 14 | 15 | 14 | 16 | 19 | 17 |
| Example 2 | 22 | 20 | 19 | 27 | 25 | 24 |
| Example 3 | 20 | 20 | 18 | 22 | 23 | 23 |
| Comparative Example 1 | 15 | 11 | 8 | 18 | 13 | 10 |
| Comparative Example 2 | 27 | 15 | 12 | 31 | 18 | 15 |
| Comparative Example 3 | 15 | 10 | 9 | 19 | 13 | 11 |

| | Frontal Brightness (cd/m$^2$) | | | | | |
|---|---|---|---|---|---|---|
| | Light Source 1 | | | Light Source 2 | | |
| | Incidence portion | Center Portion | Counter portion | Incidence portion | Center portion | Counter portion |
| Example 3 Comparative Example 4 | 25 | 17 | 15 | 29 | 17 | 15 |
| Comparative Example 5 | 13 | 10 | 8 | 16 | 13 | 12 |

Evaluation Test 2

External appearance of the reflection type or transmission type liquid-crystal display device obtained in each of Examples and Comparative Examples was observed. As a result, in each of Examples, a substantially uniform and bright light emission state was obtained on the whole surface. On the contrary, in each of Comparative Examples, light was emitted intensively in the incidence portion but brightness was reduced greatly as the location went toward the counter portion. Hence, Comparative Examples were inferior in uniformity of light emission. Particularly the diffuse type liquid-crystal device as shown in each of Comparative Examples 3 and 5 was greatly inferior in brightness to each of Examples.

Moreover, in Examples, the light emission colors of green and red in the light sources 1 and 2 could be exchanged and a bright light emission state was obtained so that display was easy to view when the liquid-crystal display device was driven. In Comparative Examples, however, display was hard to view because of variation in light emission. It is apparent from the above description that according to the present invention, light emission colors can be exchanged so that a reflection type or transmission type liquid-crystal display device using a front-lighting or back-lighting system excellent in display characteristic can be formed.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
    an upper surface;
    a lower surface;
    incidence side surfaces constituted by opposite two side surfaces between said upper surface and said lower surface; and
    a light output means in one of said upper and lower surfaces so that light incident on each of said incidence side surfaces is made exit from the other of said upper and lower surfaces through said light output means,
    wherein said light output means is constituted by a repetitive structure of irregularities having ridgelines along said incidence side surfaces, each of said irregularities having a pair of transmission light reflection surfaces which face said incidence side surfaces respectively, said transmission light reflection surfaces are inclined in directions opposite to each other, and having a pair of gentle slopes which are disposed between said pair of transmission light reflection surfaces, each of said gentle slopes is inclined in a direction opposite to the inclination direction of adjacent one of said transmission light reflection surfaces.

2. A light pipe according to claim 1, wherein said light output means is made of repetition of an irregularity unit substantially formed into a pentagon in sectional view and protruded from a reference plane of a surface in which said light output means is formed, an inclination angle of said gentle slopes with respect to said reference plane is in a range of from 0 to 10 degrees, a point of intersection between said gentle slopes is located outside said reference plane, an inclination angle of said transmission light reflection surfaces with respect to said reference plane is in a range of from 30 to 45 degrees, a projected width of each of said transmission light reflection surfaces on said reference plane is not larger than 40 $\mu$m, a repetition pitch of said irregularity units is in a range of from 50 $\mu$m to 1 mm, and the distance between adjacent ones of said irregularity units is not larger than 200 $\mu$m.

3. A light pipe according to claim 2, wherein a height of protrusion of said light output means based on said reference plane increases as each of said transmission light reflection surfaces provided so as to face said incidence side surfaces respectively goes farther from corresponding one of said incidence side surfaces.

4. A planar light source unit comprising a light pipe according to claim 1, and light sources disposed on said incidence side surfaces, respectively, of said light pipe.

5. A planar light source unit according to claim 4, wherein said light sources are provided as light sources of different color light emission which can be switched on and off.

6. A planar light source unit according to claim 4, wherein each of said light sources is a linear light source constituted by a combination of a point light source and a linear light pipe for converting incident light from said point light source to thereby form said linear light source.

7. A reflection type liquid-crystal display device comprising:
- a planar light source unit using a light pipe made of a plate-like member having a light output means in an upper surface of the plate-like member according to claim 4; and
- a reflection layer-including liquid-crystal cell disposed on said lower surface of said light pipe of said planar light source unit.

8. A transmission type liquid-crystal display device comprising:
- a planar light source unit using a light pipe made of a plate-like member having a light output means in an upper surface or said lower surface of the plate-like member according to claim 4;
- a transmission type liquid-crystal cell disposed on the upper surface of said light pipe of said light source unit; and
- a light reflection means disposed on the lower surface of said light pipe.

* * * * *